July 16, 1935.  E. R. SNAVELY  2,008,568
HOT WATER HEATING SYSTEM WITH AUXILIARY DOMESTIC WATER HEATER
Filed Feb. 21, 1934  2 Sheets—Sheet 1
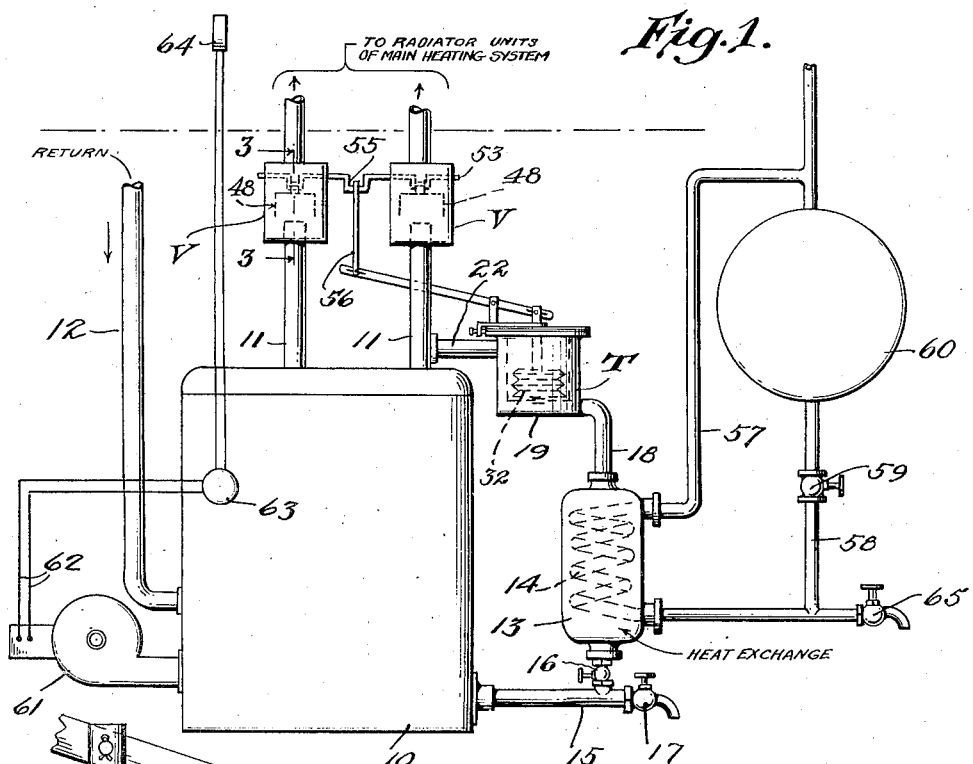
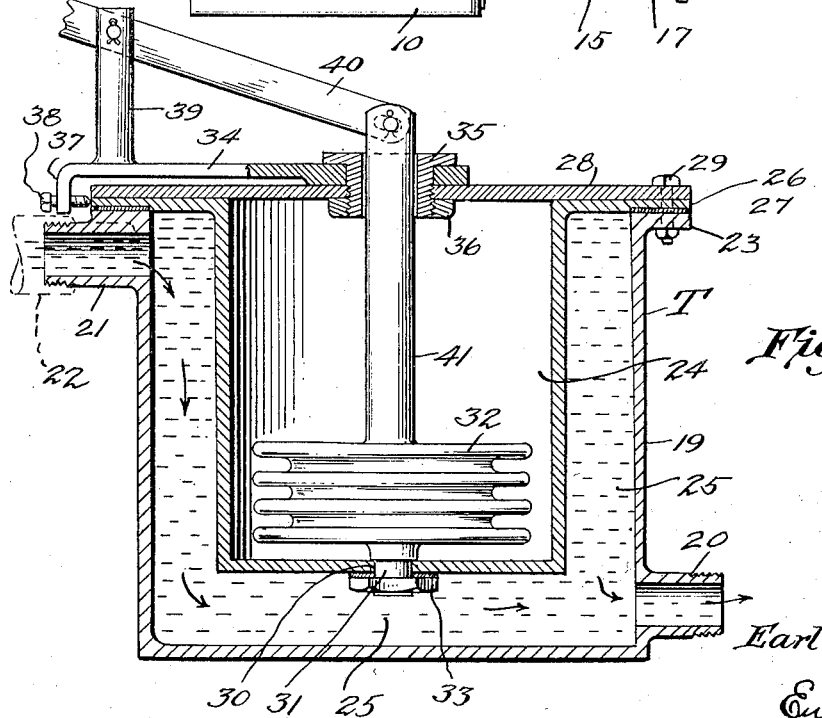
Inventor
Earl R. Snavely
Eugene C. Brown
Attorney

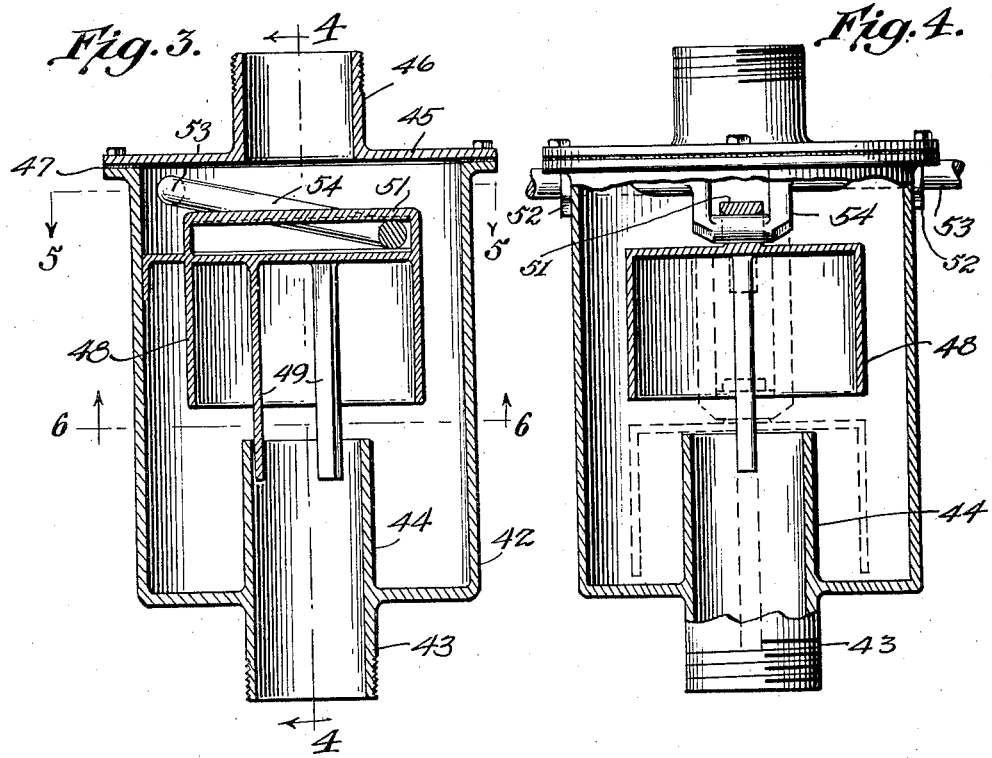
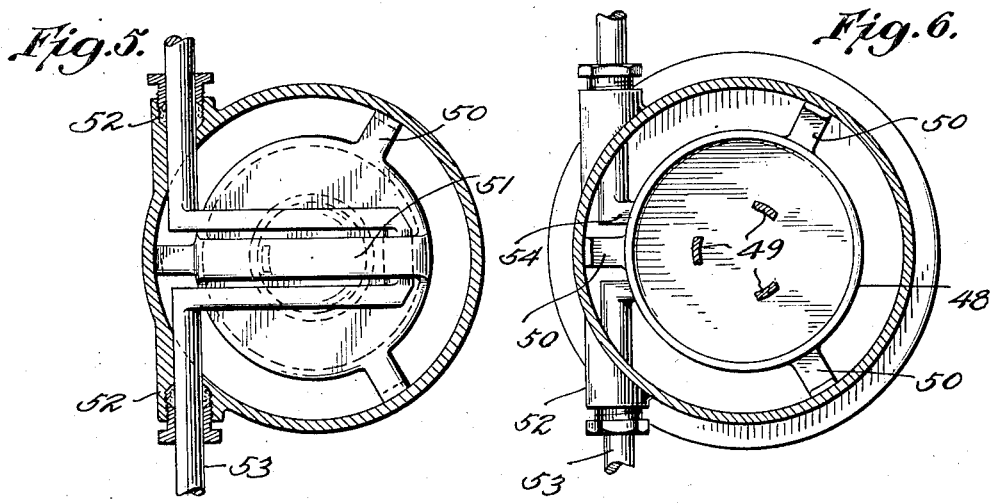

Patented July 16, 1935

2,008,568

UNITED STATES PATENT OFFICE 2,008,568

HOT WATER HEATING SYSTEM WITH AUXILIARY DOMESTIC WATER HEATER

Earl R. Snavely, Union, N. J., assignor to Evelyn L. Snavely, Newark, N. J.

Application February 21, 1934, Serial No. 712,405

4 Claims. (Cl. 237—19)

This invention relates to heating systems and particularly to the type of heating system wherein water is heated for heating rooms of the building and other water is heated for use in bathing, cooking and the like.

In systems of this character it is usual to employ a heating furnace containing water spaces or passages and a fuel combustion chamber. Radiators are connected to the water spaces of the furnace by supply and return pipes and the water system thus forms a closed circuit, hot water flowing from the furnace through the supply pipes to and through the radiators where it loses much of its heat and returns to the furnace through the return pipes. It is not desirable to draw off for house use any of the water from such a system. It is common, therefore, to have a separate system for the hot water to be used for household purposes.

It has been customary to heat the household water in a heat exchanger having a coil of copper pipe surrounded by a casing, the casing being connected in one of the supply pipes from the furnace and the coil being connected in the household piping. It is desirable to maintain a constant supply of hot water for household or domestic purposes at all times. Also, in certain factory operations it is essential that there should be a constant supply of hot water for heating certain parts of the factory or certain apparatus and that this supply be independent of the radiators used for general heating of the factory. In both residence and factory buildings it is desirable to maintain a suitable temperature independent of the weather conditions and, for that purpose, it is customary to decrease the temperature of the radiators in warmer weather and to increase such temperature during colder weather. This may be effected either by utilizing valve means to control the supply of hot water to the radiators or by controlling the furnace temperature by regulating the consumption of fuel either by manual or by thermostatic control. In any case, it is desirable to maintain a predetermined minimum temperature of the water in the furnace water space when no heat is required in the radiators so that heat may be quickly supplied to such radiators without the necessity of heating cold water.

It has been proposed to utilize thermostatically controlled valves in the supply pipes for the radiators but the usual types of hot water valves do not lend themselves to thermostatic control because of the very considerable power required for their operation.

Among the objects, therefore, of the present invention are to provide a novel combination of a main hot water heating system and a supplemental system for heating water for household or other special use, the two systems including in common a heat exchanger; to provide novel means for ensuring circulation of the water of the main system through the heat exchanger while the flow through the radiators of the main system is stopped; to provide a novel thermostatic control for such combined systems and to provide novel thermostatically controlled valves for controlling the flow of water through the main system.

In the accompanying drawings is illustrated one embodiment of my invention, and

Fig. 1 is a general schematic view in elevation of the parts of combined systems as constructed in accordance with this invention.

Fig. 2 is an enlarged vertical section through the thermostat casing used herewith, the view showing a sylphonic thermostat housed in the casing and also disclosing certain of the parts connected with the sylphon.

Fig. 3 is an enlarged detail section on the line 3—3 of Fig. 1.

Fig. 4 is a section, partly in elevation, on the line 4—4 of Fig. 3.

Fig. 5 is a section on the line 5—5 of Fig. 3.

Fig. 6 is a section on the line 6—6 of Fig. 3.

In these drawings there is illustrated, in outline, a furnace 10 which may be of any ordinary construction of that type of furnace used for hot water heating. The details of such furnaces are old and well known and it is not deemed necessary here to illustrate the same. One or more supply pipes or risers 11 lead from the upper part of the water space to the usual hot water radiators (not shown) of the main heating system and a return pipe 12 conducts the cooled water from such radiators back to the lower part of the furnace water space.

A heat exchange unit having a casing 13 enclosing a coil 14 is connected by a pipe 15 with the lower part of the water space of the furnace. A valve 16 is located in the pipe 15 and a drain cock 17 is also connected to the pipe 15 to permit draining of the main heating system. A pipe 18 leads from the upper end of the casing 13 to a thermostatic control device indicated in general at T.

The thermostatic devices for actuating valves have heretofore been enclosed within the risers and hence were not readily accessible for examination or repair. I have devised a thermostatic valve actuator and control device which is positioned in a well or double-walled casing or shell inserted in one of the water lines, preferably one leading from the top of the boiler water space to the heat exchange unit or indirect heater.

The outer shell 19 of the thermostatic valve control device is provided with nipples 20 and 21 connected respectively to the pipe 18, leading to the heat exchange unit and to the pipe 22, leading from one of the risers at the top of the boiler. The inner shell 24 is of smaller diameter, closed at the bottom and open at the top and provided with a flange 26 which is bolted at 29 to a flange 23 on the outer shell with an interposed packing ring or gasket 27. This construction provides an open well surrounded by the hot water from the boiler which circulates between the outer and inner shells.

The thermostatic device 32 which actuates the valves is preferably a sylphon bellows which contains the usual highly volatile liquid. A threaded stud 31 projecting from the bottom, extends through an opening 30 in the bottom of the inner shell or cup 24 and is secured by a nut 33. A stem 41 projects upwardly from the sylphon bellows and is guided through a tubular bolt 35 secured by nut 36 in a central opening in the cover plate 28. The valve-operating lever 40 is pivotally secured at its inner end to the top of the stem 41 and is fulcrumed on a post 39 which is carried by a radial arm 34 having an eye surrounding the bolt 35 and rigidly held by a set screw 38 passing through a down turned lug on the outer end of the arm.

In each of the pipes or risers 11 is interposed a valve indicated in general at V. Each of these valves comprises a casing 42 having a bottom through which extends a tubular member forming an outer nipple 43 and an inner nipple 44, the pipe 11 having its lower section threaded to the lower nipple. A cover 45 closes the upper end of the casing 42 and is provided with an upwardly projecting nipple 46 whereto is connected the upper section of the riser piper 11. A packing ring or gasket 47 is interposed between the cover 45 and casing 42. An inverted cup 48 is located within the casing and is of considerably greater diameter than the nipple 44. This cup is movable between the full line position and the dotted line position of Fig. 4, the upper position being its open position and the lower position being the closed position. The cup normally contains air so that, when depressed the flow of hot water upwardly through the valve is interrupted by the air-gap formed in the line. Guide prongs 49 extend downwardly from the top or closed end of the cup and engage the inner surface of the nipple 44. Similarly, guide lugs 50 extend radially from the upper end of the cup and engage the inner surface of the body 42. By means of these prongs and lugs the cup is constrained to move in a vertical rectilinear path without tilting or cocking and thus without sticking or jamming. A yoke 51 extends diametrically across the top of the cup 48. Packing glands or boxes 52 are alined opposite each other on the upper part of the cup and through these glands extends a shaft 53 having a U-shaped crank 54 which straddles the yoke 51 and engages at its free end beneath said yoke so that oscillation of the shaft 53 effects the raising and lowering of the cup 48. An actuating crank 55 is provided on that portion of the shaft which is exterior of the valve and a connecting rod 56 connects the crank 55 with the end of the lever remote from the stem 41. Where two or more pipes 11 are used, then valves may be disposed side by side as shown in Fig. 1 and the shaft 53 may extend continuously through the several valve bodies so that but one thermostat and one crank 55 is necessary to effect opening and closing of the several valves in unison.

At 60 is indicated a hot water storage tank which is to be understood as showing any apparatus or means which it is desired to supply constantly with hot water. A pipe 57 connects the upper end of the coil 14 to this tank and a second pipe 58 connects the lower end of the coil 14 to the tank. A valve 59 is preferably interposed in the pipe 58 and a drain cock 65 is also connected to this pipe so that the supplementary system may be drained if desired.

While the fuel consumption may be regulated by hand it is preferred to utilize automatic means for this purpose. Thus motor driven blower or oil burner 61 may be connected by conductors 62 to a furnace control thermostatic device 63 and a room thermostat 64, in a compartment heated by the main heating system. The furnace control switch may be of any desired type capable of closing the circuit for operating the device 61 upon the boiler temperature dropping to a predetermined minimum temperature and opening the circuit upon the water in the furnace reaching a predetermined higher temperature and the room thermostat is likewise of any well known type capable of adjustment to close the circuit at a predetermined low room temperature and to open the circuit at a predetermined high room temperature. The sylphon bellows is so proportioned and connected to the shaft that it is expanded to operate the valves 48 to upper open position when the water circulating through the channel 25 between the inner and outer walls of the thermostat casing or housing T, is raised to a temperature sufficient to heat the radiators to room temperature. This occurs when a room thermostat 64 closes the circuit which controls the furnace dampers or the fuel supply blower. As soon as the furnace responds, heating the water to the desired temperature, the sylphon bellows 32 expands and operates the valves 48 to open position, thereby permitting the water to circulate through the house heating system.

When the room thermostat opens its contacts, the furnace draft or fuel control device 61 shuts off, causing the water in the furnace to cool down to a minimum predetermined temperature required by the heat exchange unit 13 to heat the water in the storage tank 60 at the temperature required for domestic purposes. This minimum boiler temperature may be controlled by a suitable hydrostat 63 attached to the boiler. As soon as the water in the risers has dropped below that required for the house heating system, the sylphon bellows contracts and lowers the riser valves 48 to closed position. It is obvious that other types of valves may be used.

While the sylphon bellows is well adapted for actuating the riser valves, it is obvious that other types of thermostatic devices may be employed. By locating the thermostatic device in a well or housing which is exterior to the water channels, it may be readily inspected or removed.

I claim:—

1. The combination with separate main and secondary hot water heating systems, of a boiler and a supply pipe connecting said boiler to said main system, a connection between said supply pipe and said boiler, a heat exchange unit interposed in said connection, for supplying heat to said secondary system, a thermostat receiving heat from the fluid in said connection, valve means between said connection and said main system operating to open or close the flow through the main system, and operative means between the thermostat and said valve means to actuate the latter to open position when the fluid in the last named connection reaches a predetermined high temperature.

2. The combination with separate main and secondary hot water heating systems, of a boiler and a supply pipe from said main boiler to said system, a connection between said supply pipe and said boiler, a heat exchange unit interposed in said connection for supplying heat to said secondary system, a hollow double-walled casing in said connection providing a chamber or well, inlet and outlet passages connecting the channel formed between the walls of said casing with said last named connection, valve means between said connection and said main system operating to open or close the flow of water through the main system, a thermostat located in said well, and operative means connecting said thermostat and said valve means to open or close said valve means in response to high or low temperature changes respectively in the water flowing through said channel.

3. The combination with separate main and secondary hot water heating systems, of a boiler and a supply pipe from said boiler to said system, a connection between said supply pipe and said boiler, a heat exchange unit interposed in said connection for supplying heat to said secondary system, a hollow double-walled casing in said connection providing a chamber or well, inlet and outlet passages connecting the channel formed between the walls of said casing with said connection, valve means between said connection and said main system operating to open or close the flow of water through the main system, a sylphon bellows located in said well and having one end removably attached to the bottom wall thereof, and a linkage connecting the other end of said bellows with said valve means to thereby open and close said valve means in accordance with the expansion and contraction of the bellows.

4. In an automatic control system for a house heating system, a boiler and a supply pipe connected from the upper part of said boiler to said system, means for controlling the boiler temperature, a connection between said supply pipe and the lower part of said boiler, a valve in said supply pipe beyond said connection, a recess or hollow chamber within said last named connection, a sylphon bellows secured within said chamber responsive to temperature changes of the fluid in said connection, and means operatively connecting said bellows with said valve to open and close the valve in accordance with said temperature changes.

EARL R. SNAVELY.